Patented Feb. 6, 1934

1,946,338

UNITED STATES PATENT OFFICE 1,946,338

TRACING PAPER AND METHOD OF PRODUCING

Harold M. Spurlin, Kenvil, N. J., assignor to Hercules Powder Company, Wilmington, Del., a corporation of Delaware No Drawing. Application September 11, 1929
Serial No. 391,981

1 Claim. (Cl. 91—68)

My invention relates to an improvement in tracing paper and method of producing.

The method in accordance with my invention from the broad standpoint involves the treatment of paper with a cellulose lacquer.

Desirably, the paper treated should be a thin, fine grained paper free from sizing or mineral fillers, as, for example, onion skin typewriter paper, though where maximum results are not required, such characteristics are not essential.

More specifically, my method involves impregnation as well as coating of the paper and, still more specifically, the use, in the coating and/or impregnation, of a nitrocellulose lacquer of such a character as to give a film having a refractive index within about the range 1.50-1.52, and desirably having a refractive index of about 1.52. My method also contemplates the coating and/or impregnation of a paper with a nitrocellulose lacquer including a plasticizer and/or a gum or resin, which may, if desired, be in such mixture as to give a film of refractive index substantially the same as that of the cellulose of the paper, or, if desired, there may be included a suitable substance having a refractive index, such as to counteract the relatively low refractive index, below 1.50, of most of the known plasticizers, gums and resins, as, for example, bromonaphthaline, refractive index 1.69, and preferably α bromonaphthalene.

The product in accordance with my invention involves a tracing paper comprising paper coated, or coated and impregnated with a nitrocellulose lacquer; more specifically, a paper coated or impregnated and coated with a nitrocellulose lacquer which, if desired, may be such as will give a film having a refractive index within about the range 1.50-1.52, and still more particularly a paper coated or impregnated and coated with a lacquer containing such a combination of placticizer, gum and/or resin as to give a film with refractive index substantially the same as that of the cellulose of the paper.

In the practical adaptation of the method in accordance with my invention for the production of a tracing paper embodying my invention, for example, a thin, fine grained paper free from sizing or filler, as typewriter second sheets, is selected and a nitrocellulose lacquer, desirably containing a plasticizer which may desirably be a solvent plasticizer, such as triphenylphosphate, tricresyl phosphate, tributyl phosphate, ethyl abietate dibutyl phthalate or like plasticizers, is sprayed on the surface of the paper to form a relatively thin film thereon. As an alternative procedure, the paper may be dipped in the lacquer to effect its impregnation and a lacquer, comprising a solution of nitrocellulose in a solvent and with little or no plasticizer, sprayed on a surface of the paper to form a thin film thereon.

As illustrative of a practical adaptation of my invention, for example, a lacquer is prepared according to the following illustrative formula:

| | Parts |
|---|---|
| Nitrocotton (¼" or ½") | 50.0 |
| Tricresyl phosphate | 30.0 |
| Butyl acetate | 150.0 |
| Toluene | 100.0 |

For the production of tracing paper, the above lacquer is sprayed on one or both surfaces of, for example, an onion skin typewriter paper in sufficient quantity to produce a relatively thin film thereon, on drying. After drying of the film, the paper is ready for use.

As a further illustration, for example, a lacquer is prepared according to the following illustrative formula:

| | Per cent |
|---|---|
| Nitrocellulose (½" or ¼") | 10 |
| Dibutyl phthalate | 5 |
| Butyl acetate | 20 |
| Ethyl acetate | 6 |
| Toluene | 45 |
| Butanol | 6 |
| Ester gum | 8 |

The above lacquer may be sprayed on one or both surfaces of the paper, or the paper dipped therein. Alternatively, the paper, having been dipped in the lacquer according to the above formula, or one containing nitrocellulose and a plasticizer, is sprayed with a solution of nitrocellulose, which may contain a small amount of plasticizer or resin, to form a thin film on the surface thereof, which will give a surface free from greasiness, a characteristic of films including plasticizers, in any large amount. If desired, the surface of the paper not intended to receive ink may be coated more heavily than the ink-receiving surface for the purpose of increased waterproofing effect, it being noted that the film on the ink-receiving surface should be relatively thin, since its adaptability for desirably receiving ink will be decreased with excessive thickness of film.

It will now be noted that in accordance with my invention there is produced readily and inexpensively a tracing paper having to a superior degree the capacity to receive ink, of a desirable degree of transparency and waterproof to a high degree.

What I claim and desire to protect by Letters Patent is:

As a new article of manufacture a sheet capable of receiving ink, substantially transparent and waterproof and substantially free from greasiness and comprising a thin sheet of substantially porous paper impregnated with and having a thin surface coating comprising essentially a composition containing nitrocellulose and a plasticizer.

HAROLD M. SPURLIN.